(12) United States Patent
Cohen

(10) Patent No.: US 8,602,304 B2
(45) Date of Patent: Dec. 10, 2013

(54) HOUSING FOR ADAPTING MOBILE ELECTRONIC DEVICE FOR PAYMENT SYSTEM

(75) Inventor: Israel Y. Cohen, Oakland, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 13/441,406

(22) Filed: Apr. 6, 2012

(65) Prior Publication Data

US 2013/0264234 A1    Oct. 10, 2013

(51) Int. Cl.
*G06K 7/08* (2006.01)
*H05K 7/00* (2006.01)

(52) U.S. Cl.
USPC ..................................... 235/449; 361/679.06

(58) Field of Classification Search
USPC ............... 235/449; 361/684, 679.06
See application file for complete search history.

(56) References Cited

U.S. PATENT DOCUMENTS

| | | | | |
|---|---|---|---|---|
| 5,606,594 | A * | 2/1997 | Register et al. | 455/556.2 |
| 6,516,202 | B1 * | 2/2003 | Hawkins et al. | 455/556.2 |
| 2002/0142799 | A1 * | 10/2002 | Chu-Chia et al. | 455/556 |
| 2003/0092468 | A1 * | 5/2003 | North | 455/556 |
| 2003/0211864 | A1 * | 11/2003 | Bodnar et al. | 455/556.1 |
| 2008/0259551 | A1 * | 10/2008 | Gavenda et al. | 361/684 |

* cited by examiner

Primary Examiner — Daniel Hess
(74) Attorney, Agent, or Firm — Fish & Richardson P.C.

(57) ABSTRACT

A housing for a mobile electronic device that houses both the mobile electronic device and an attached payment accessory. The section of the housing that houses the mobile electronic device secures the payment accessory in place while allowing access to the mobile electronic device's screen, buttons, and other inputs and outputs. The section of the housing that houses the payment accessory attached to the mobile electronic device allows access to the payment accessory's payment capabilities from beyond the housing.

13 Claims, 5 Drawing Sheets

HOUSING FOR ADAPTING MOBILE ELECTRONIC DEVICE FOR PAYMENT SYSTEM

BACKGROUND OF THE INVENTION

1. Technical Field

The present disclosure relates to a housing for a mobile electronic device that houses both the mobile electronic device and a connected payment accessory. One application of the present disclosure relates to the use of a mobile electronic device in an electronic payment transaction setting.

2. Background of the Invention

Mobile electronic devices that include communications capabilities—such as smartphones and devices running the iOS, Android, or Blackberry operating systems—have become increasingly capable for use in payment management systems. Often, these devices can be enhanced with third-party hardware and software. Banks, credit card companies, and other financial institutions can easily provide add-ons to these mobile electronic devices to increase the mobile electronic device's functionality in the context of electronic payments.

In one conventional arrangement, a mobile electronic device may be loaded with software that allows the user to access an online payment processing system from the mobile electronic device. In another conventional arrangement, a product that allows for credit card processing via mobile electronic devices through an accessory attachable to the mobile electronic device is used. In addition, the rise of near field communication technology has allowed for payment transactions to be carried out through the use of devices equipped with this capability.

The end result is that inexpensive smartphones and other mobile electronic devices, if equipped with the right hardware and/or software, can have all the functionality of expensive traditional point-of-sale systems, such as credit card readers issued by a traditional payment processing service. Moreover, systems that utilize consumer electronics may be attractive to merchants because there are often fewer startup costs associated with these systems than there are with traditional point-of-sale systems, and there are also often lower fees for payment transactions. Thus, there are many reasons a merchant, retailer, or anyone else who accepts electronic payments would want to use a payment management system based on a mobile electronic device rather than a traditional point-of-sale system.

SUMMARY OF THE INVENTION

Disclosed herein are techniques for housing both a mobile electronic device and a payment accessory connected to the mobile electronic device. One embodiment of the invention is an apparatus comprising a housing configured to encase or attach to a mobile electronic device and an accessory device in electronic communication with the mobile electronic device, and a surface on said housing configured to facilitate communication between a user device and the accessory device. In another embodiment, the surface is aligned with a corresponding surface on the accessory device, and the surface on the housing facilitates communication between the user device and the corresponding surface on the accessory device. In one embodiment, the surface on the housing facilitates a data connection between the user device and the accessory device.

In another embodiment, the apparatus comprises a rotation mechanism interfacing with the housing about an axis, wherein said rotation mechanism allows the housing to rotate about the axis and allows the mobile electronic device to be rotated to both portrait and landscape orientations. In another embodiment, the apparatus comprises a base having a circular axis and a bottom plane, wherein said circular axis interfaces with the housing and the bottom plane to facilitate the housing to rotate about the axis relative to the bottom plane. In still another embodiment, the apparatus comprises a base having a bottom plane and one or more necks protruding substantially perpendicular from said base and interfacing with the housing. In another embodiment, the one or more necks interface with the housing via one or more pivot joints and allow the housing to articulate about said pivot joints. The one or more necks interface with the housing via one or more ball joints and allow the housing to rotate about said ball joints in another embodiment.

In one embodiment, the apparatus comprises a locking mechanism that secures the mobile electronic device within the housing when engaged.

In one embodiment the apparatus comprises a housing configured to encase or attach to a mobile electronic device and an accessory device connected to the mobile electronic device, and an aperture on said housing configured to facilitate communication between a credit card and the accessory device. The aperture is aligned with a corresponding aperture on the accessory device, and communication between the credit card and the aperture facilitates communication between the user device and the corresponding aperture in another embodiment.

In one embodiment, the apparatus comprises a housing configured to encase or attach to a mobile electronic device and an accessory device connected to the mobile electronic device, and a pad on said housing configured to facilitate communication between a user device configured to transmit wireless electronic communication and the accessory device. In another embodiment, the pad is aligned with a receiver on the accessory device configured to receive wireless electronic communication, and communication between the user device and the pad facilitates a data connection between the user device and the receiver.

In one embodiment, an apparatus for housing a mobile electronic device and a payment accessory in electronic communication with said mobile electronic device, the mobile electronic device having inputs and outputs, and the payment accessory having payment capabilities and configured to communicate with a user payment device, comprising a first section which is configured to fit closely around or attach to the mobile electronic device and which substantially covers the mobile electronic device excluding the mobile electronic device's inputs and outputs; and a second section which is configured to fit closely around the payment accessory, and which offers access to the payment accessory's payment capabilities from beyond the second section. In one embodiment, the user payment device is a credit card, and the second section includes a credit card slot configured to accept a credit card and aligned with the payment accessory such that movement of the credit card through the credit card slot allows the credit card to communicate with the payment accessory and be read by the payment accessory. In still another embodiment, the user payment device is a device capable of transmitting information using wireless electronic communication, and the second section includes a pad configured to facilitate wireless electronic communication and aligned with the payment accessory such that physical communication with the pad allows wireless electronic communication between the payment accessory and the payment device. In one embodiment, the payment accessory is permanently affixed to the second section.

Another embodiment is a system comprising a mobile electronic device, the mobile electronic device having inputs and outputs; a payment accessory connected to said mobile electronic device, having payment capabilities and configured to communicate with a user payment device; a first section which is configured to fit closely around or attach to the mobile electronic device and which substantially covers the mobile electronic device excluding the mobile electronic device's inputs and outputs; and a second section which is configured to fit closely around the payment accessory, and which offers a user access to the payment accessory's payment capabilities from beyond the second section.

In one embodiment, the user payment device is a credit card, and the second section includes a credit card slot configured to accept a credit card and aligned with the payment accessory such that movement of the credit card through the credit card slot allows the credit card to communicate with the payment accessory and be read by the payment accessory.

In another embodiment the user payment device is a device capable of transmitting information using wireless electronic communication, and the second section includes a pad configured to facilitate wireless electronic communication and aligned with the payment accessory such that physical communication with the pad allows wireless electronic communication between the payment accessory and the payment device.

With conventional arrangements, it is evident and conspicuous that the merchant, retailer, or other user is using a mobile electronic device configured to accept payments, rather than a dedicated point-of-sale device. Retailers and service providers, etc. may be disinclined to use a mobile electronic device as a payment processing unit because of the possible perception that it is unprofessional to use one's personal cell phone or other mobile electronic device as a point-of-sale unit. In addition, because mobile electronic devices are often mobile or portable, businesses may be concerned with theft and may not want employees or customers to have easy access to the physical device.

To this end, the present disclosure offers a way to make a mobile electronic device that is adapted to receive payments act and function more like a traditional point-of-sale unit. Specifically, the present invention relates to a housing that houses both a mobile electronic device and a connected payment accessory. The housing thus integrates the mobile electronic device and payment accessory in a way not contemplated by other housings. A customer making use of the invention while transacting with a merchant may perceive the housing, the mobile electronic device, and the payment accessory as a single entity, in much the same way as she would with a traditional point-of-sale unit.

This and other features and advantages of the present disclosure will be apparent from the following detailed description of illustrative embodiments thereof, which is to be read in connection with the accompanying drawings.

DETAILED DESCRIPTION OF THE INVENTION

Figure 1:
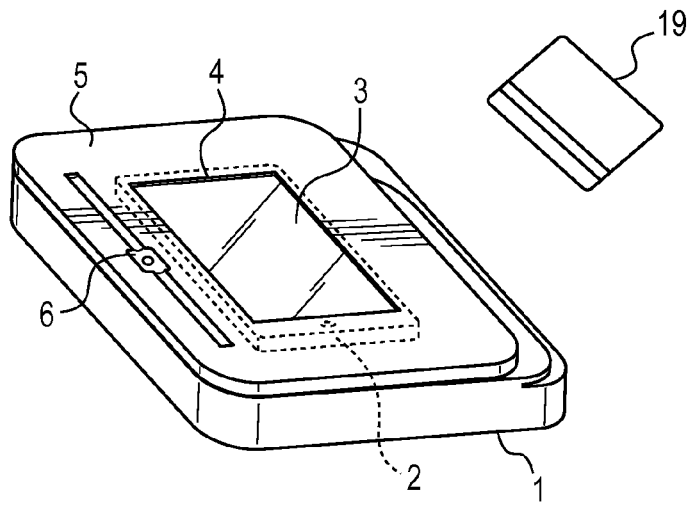
FIG. 1 shows one example embodiment in its closed (functioning) state, as it would appear to a customer.

FIG. 1 illustrates an example embodiment as it appears in its closed, or functioning, state. The housing houses a mobile electronic device 2 with a screen 3 such that the mobile electronic device 2 is secured in place and the mobile electronic device's screen 3 is visible and accessible to the user through the opening 4 in the bezel 5. It is contemplated that the bezel may also have additional openings to allow access to the mobile electronic device's buttons, ports, or other input functions, as the case may be. The rest of the mobile electronic device may be hidden or otherwise obstructed by the bezel 5. Thus, when this description refers to the opening in the bezel for the mobile electronic device's screen, other openings within the bezel are also contemplated, according to the needs of the particular mobile electronic device.

It is contemplated that a customer may need to sign a signature in order to complete a purchase. Accordingly, an indentation 6 adapted to hold a pen or stylus (not shown) may, optionally, be incorporated into the bezel 5, according to this embodiment.

Figure 2:
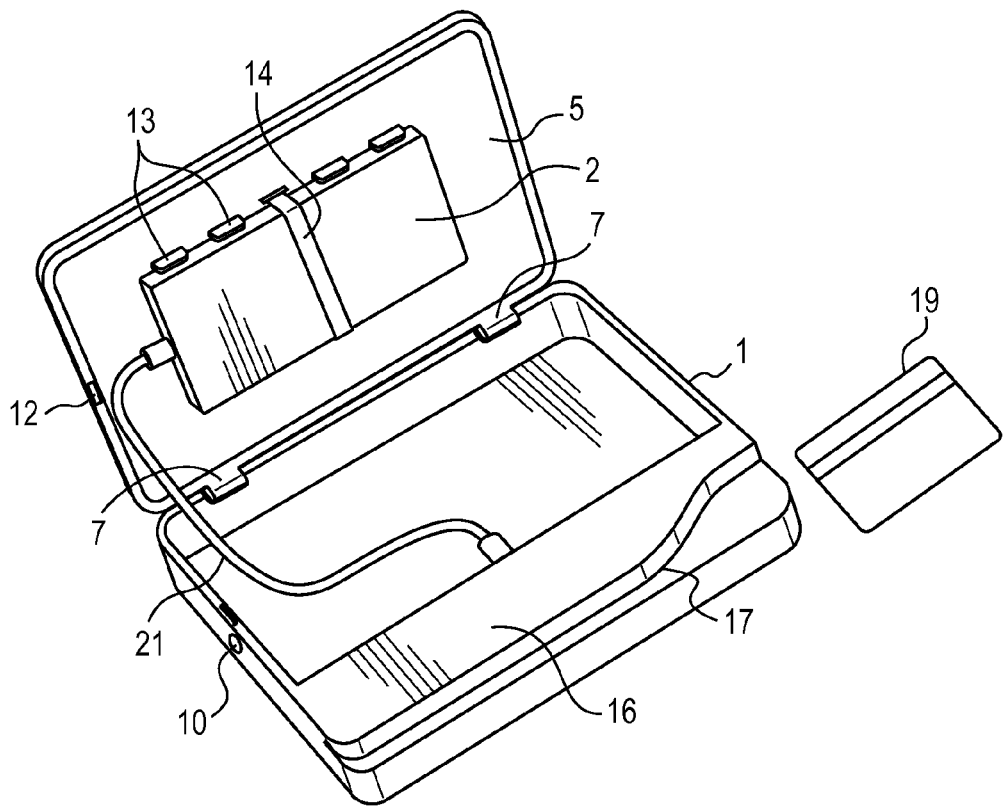
FIGS. 2 and 3 show perspectives of the example embodiment as in FIG. 1, while it is in its open (preparation) state.
Figure 3:
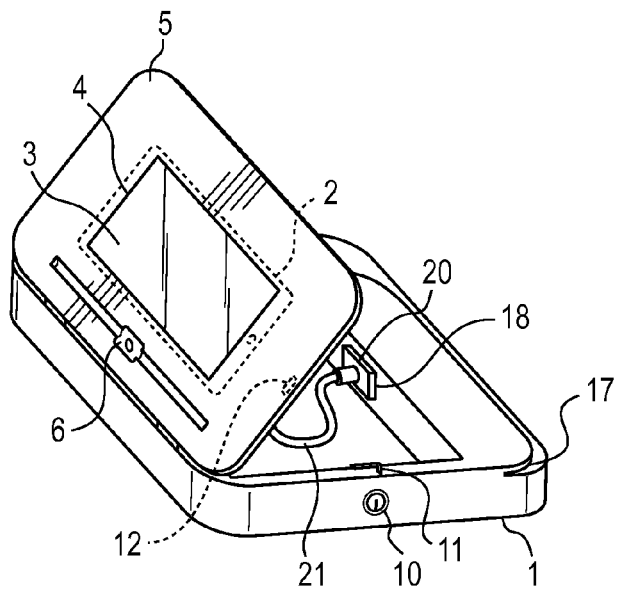
Figure 4:
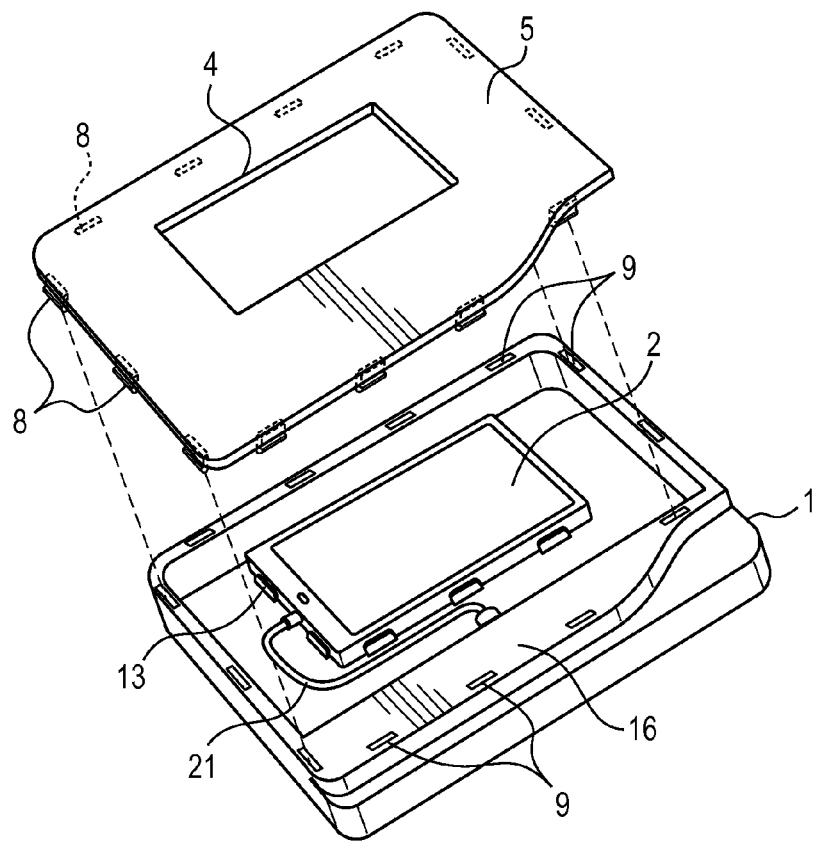
FIGS. 4 and 5 show alternate example embodiments in which the mobile electronic device is secured to the housing in a different way.

FIGS. 2-3 illustrate aspects of the invention in more detail, according to this preferred embodiment. In these figures, the housing is shown in its open, or preparation, state. The bezel 5 is connected to the body 1. This may be accomplished through the use of hinges 7, as in FIG. 2, or through the use of tabs 8 and corresponding grooves 9, as is familiar in the art, as illustrated by FIG. 4. Referring to FIG. 3, when the bezel 5 is closed upon the body 1, an optional locking mechanism 10 may be engaged to securely fasten the bezel 5 to the body 1. The locking mechanism 10 may include a pin 11 that, when engaged, is inserted into a pin receptacle 12 and thereby inhibits the bezel 5 from being removed or disengaged from the body 1. It is contemplated that the locking mechanism 10 may comprise any type of locking mechanism familiar in the art, including but not limited to key locks, combination locks, or fingerprint reader locks. The mobile electronic device 2 is secured snugly in place within the housing through the use of supports 13 that are measured to and fit closely around the mobile electronic device 2, and/or straps 14 that hold the mobile electronic device in place.

Still in FIGS. 2-3, the screen 3 of the mobile electronic device 2 is viewable and accessible through the opening 4 in the bezel 5. In this embodiment, the mobile electronic device 2 is secured in place to the bezel 5—such that the screen is aligned to the bezel opening 4—through the use of supports 13 that are measured to and fit snugly around the mobile electronic device 2, and/or straps 14 that hold the mobile electronic device in place, or the like. FIG. 4 illustrates a similar example embodiment in which the mobile electronic device 2 is secured in place to the body 1—also through the use of supports 13 that are measured to and fit snugly around the mobile electronic device 2, and/or straps 14 that hold the mobile electronic device in place, or the like. In any case, the mobile electronic device 2 is held firmly in place so that its screen 3 is aligned to the bezel opening 4 and is accessible to a user. As is evident from the minor differences between the figures, the invention may be practiced with minor modifications without departing from the spirit and scope of the appended claims.

Figure 5:
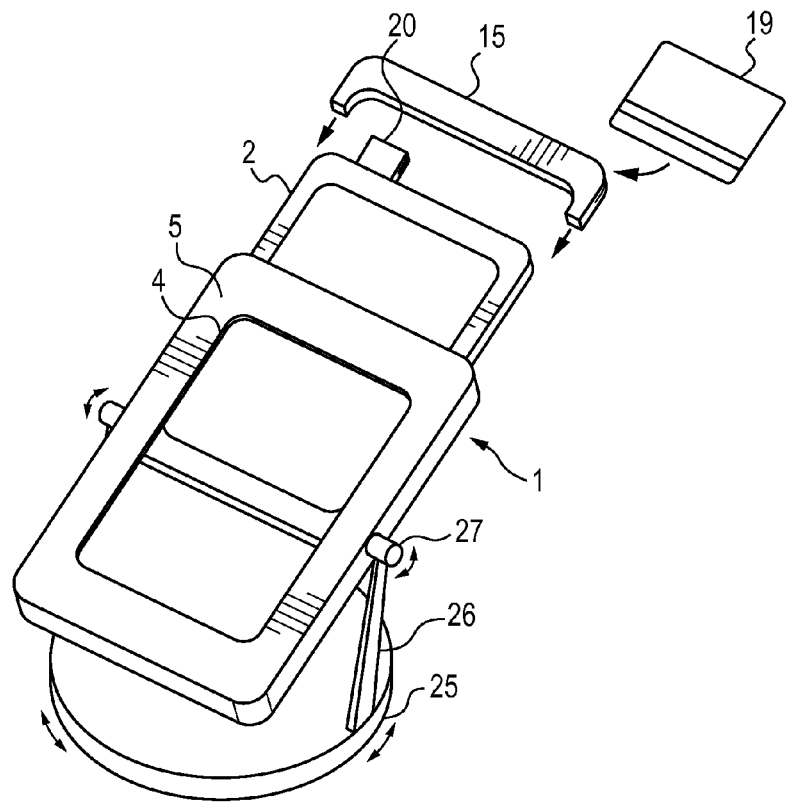

FIG. 5 illustrates an example embodiment in which the bezel 5 is integrated with the body 1, which includes a removable endcap 15. When the endcap is removed, the mobile electronic device 2 may be inserted into the body 1, and is secured within the housing when the endcap 15 is placed on the body 1. Thus, the mobile electronic device 2 is fully surrounded and fits snugly in the housing. When the mobile electronic device 2 is securely in place in the housing, its screen 3 is aligned to the opening in the bezel 4.

Turning back to the detail of FIG. 2-3, the housing includes a payment section 16, which in this example embodiment includes a credit card slot 17 and a space or recess 18 configured to accept and fit closely around a payment accessory 20. When a credit card 19 is run through the credit card slot 17, it passes through the payment accessory 20 and is read by the payment accessory 20. This is accomplished with the alignment between the credit card slot 17 and the space or recess 18 configured or adapted to accept and fit closely around the payment accessory 20. In one embodiment, the space 18 comprises a recess in the housing configured to receive the payment accessory 20. The credit card slot 17 aligns to the payment accessory's 20 own credit card slot (where the payment accessory is a credit card reader) when the payment accessory is inserted within the space 18, so that when a user slides a credit card 19 through the credit card slot 17, it effortlessly passes through the payment accessory's 20 credit card slot and can be read thereby. The credit card 19 is one example of a user device and the credit card slot 17 is an example of a surface on the housing configured to facilitate communication between the user device and the accessory device.

Figure 6:
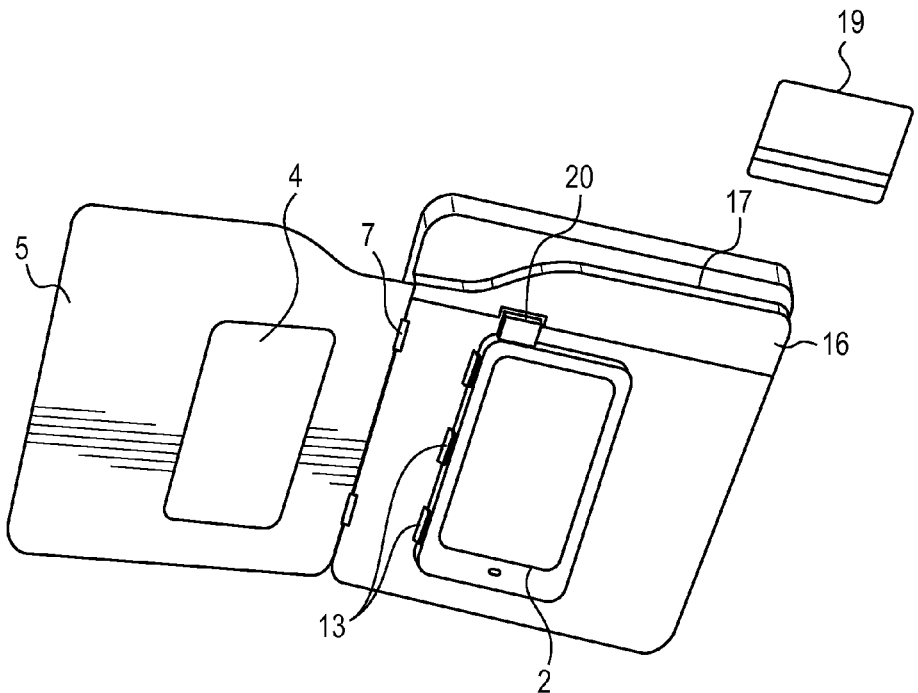
FIG. 6 shows an alternate example embodiment in which the payment accessory is connected to the mobile electronic device in a different way.

The payment accessory 20 may be connected to the mobile electronic device 2 through the use of a cable 21, as is illustrated by FIG. 3. FIGS. 5 and 6 illustrate embodiments wherein the payment accessory 20 may be in electronic communication with the mobile electronic device 2 by a direct connection, without the need for a cable. It is also contemplated that the payment accessory 20 may be electronically connected to or in electronic communication with the mobile electronic device 2 by other means, such as wireless communication. In FIG. 5, where the housing includes an endcap 15, the endcap 15 may include the payment section 16, including the space or recess 18 adapted to accept and fit closely around the payment accessory 20, and a credit card slot 17 for accepting a credit card 19, in the manner described above. The endcap may connect to the body 1 through the use of tabs 8 and corresponding grooves 9, as described elsewhere in this specification, or through any other type of fastener (such as hinges) as may be familiar in the art. As is evident from the minor differences between the figures, the housing may be practiced with minor modifications without departing from the spirit and scope of the appended claims.

In another embodiment of the present invention, with reference to FIG. 5, the housing comprises an attachment 15 for a mobile electronic device 2. In this embodiment, the body 1 of the housing shown in FIG. 5 is omitted, and the attachment is secured to or attached to the mobile electronic device 2 by other means. In the example shown in FIG. 5, the attachment or housing 15 slides over only a portion of the mobile electronic device 2 and payment device 20. The attachment 15 may be held or secured to the mobile electronic device using any means known in the art. In reference to FIG. 5, the ends of attachment 15 can be inwardly biased such that when the attachment 15 is placed on the mobile electronic device 2 as indicated by the arrows next to attachment 15, the ends apply a compressive force on the mobile electronic device 2, securing the attachment 15 to the mobile electronic device 2 until the user desires to remove it by applying a force in the direction opposite the direction used to secure the attachment 15 to the mobile electronic device 2. In other embodiments, the attachment can comprise one or a combination of a clip, a tab, a clamp, a spring, or other known attaching means that can removably secure the attachment to the mobile electronic device. In any embodiment, the attachment 15 comprises either a credit card slot 17 or a near field communication pad 23, as described elsewhere herein, and a space or recess configured to receive a payment accessory 20 or 22 in electronic communication with the mobile electronic device 2.

Figure 7:
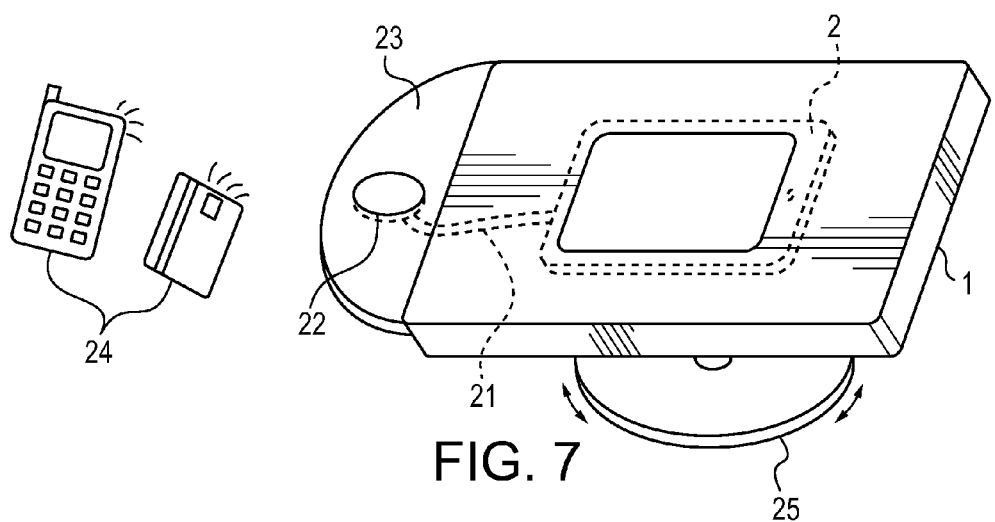
FIG. 7 shows an example embodiment wherein the payment accessory is a near field communication reader.

In the example embodiment illustrated in FIG. 7, in which the payment accessory 22 is a near field communication reader instead of a credit card reader, the payment section 16 is adapted to accept the payment accessory 22 attached to the mobile electronic device 2 and includes a near field communication pad 23 that conceals the payment accessory 22 but does not inhibit wireless or contactless communication between the payment accessory 22 and a payment method 24, which also utilizes near field communication (NFC) technology. Near field communication (NFC) is a wireless communication technology used by mobile electronic devices to establish wireless communication with each other by bringing them in close proximity to each other. NFC technology currently includes communications protocols and data exchange formats, and is based on existing radio-frequency identification (RFID) standards including ISO/IEC 14443, FeliCa, and ISO/IEC 18092. Examples of payment methods are NFC smart cards and NFC-equipped smartphones. Thus, when a user places the payment method 24 in proximity to the near field communication pad 23 of the payment section 16, the payment method 24 can be read by the payment accessory 22.

Figure 8:
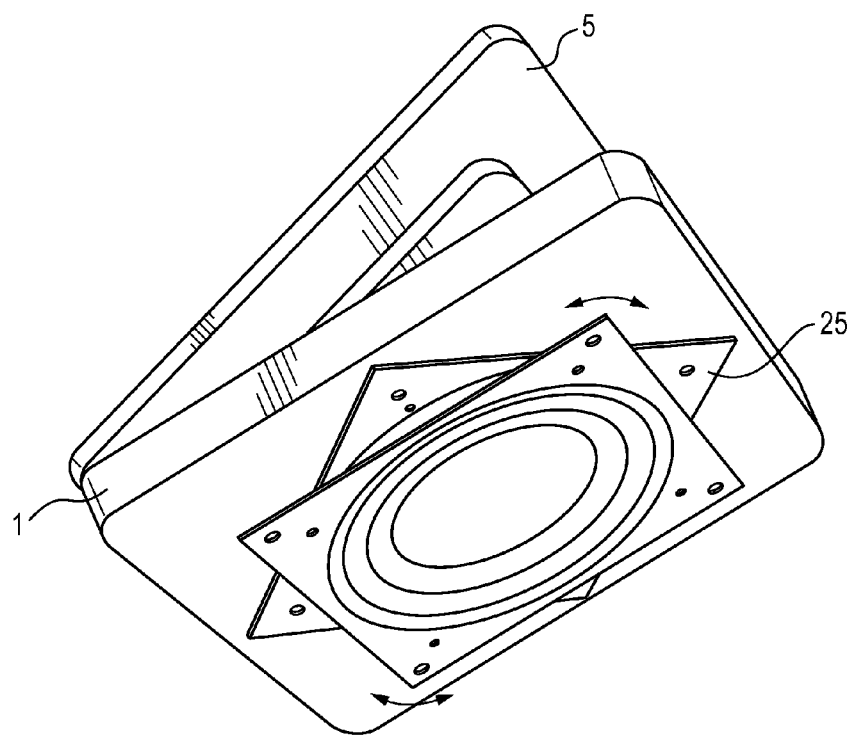
FIGS. 8, 9, and 10 show example embodiments of the invention that include the ability to swivel, pivot, or rotate.

FIG. 8 illustrates an example embodiment of the invention. It is contemplated that an embodiment of the invention may contain a swivel base 25 or other rotational points. The reason is that it is contemplated that the housing may be used by more than one person or from more than one location. For example, the housing may be used in a point-of-sale environment, where a store employee uses it from one location, and the customer from another. Thus, the store employee may desire to swivel the housing to provide easy access to customers, who may need to consult the information displayed on the mobile electronic device's screen 3, or who may need to sign their signature or input a PIN or other information into the mobile electronic device 2. In addition, the flexibility afforded by rotational capability provides greater customer access to the payment section 16. Thus, the base may contain a swivel assembly. Such assemblies may include two circular portions that swivel about an axis, thus allowing the housing to swivel when the bottom portion is resting on a surface. Such assemblies may also include bearings to allow swivel movement; all means and mechanisms facilitating swivel movement are contemplated.

Figure 9:
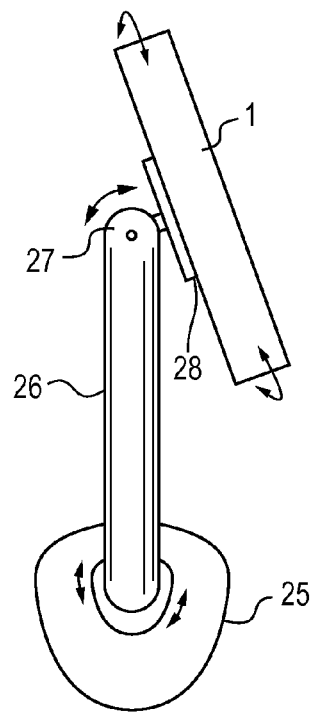
Figure 10:
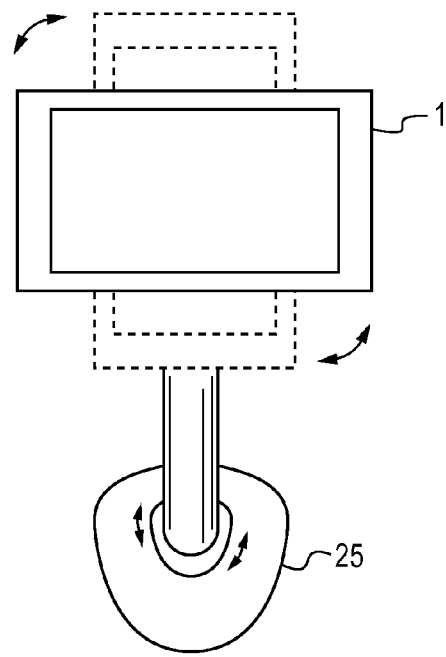

It is further contemplated that an example embodiment may contain other rotational points instead of or in addition to a swivel base. For example, FIG. 9 illustrates an example embodiment of the invention wherein one or more necks 26 are provided, and pivot joints 27 (or hinges) connect the neck 26 to the body 1. Thus, the body 1 may be pivoted along the pivot joints, thereby changing the pitch at which the mobile electronic device 2 may be viewed. All means and mechanisms facilitating pivot movement are contemplated. Pivot mechanisms may be employed that pivot horizontally, or vertically, or both. Ball joints, as are commonly understood in the art, may be employed to allow for movement in multiple directions at once. Further, it is understood from knowledge in the art that many modern mobile electronic devices employ accelerometers and other orientation sensors to determine orientation, and they display the contents of their screens accordingly. Thus, it is additionally contemplated that an example embodiment of the invention may include a rotating mechanism 28 that allows the mobile electronic device 2 to be viewed in both landscape and portrait orientations, in accordance with the orientation detecting capabilities of modern mobile electronic devices commonly understood in the art. All means and mechanisms facilitating rotational movement are contemplated. As is evident from FIGS. 9 and 10, the pivot and rotational mechanisms may allow the store employee and the customer to view the screen 3 of the mobile electronic device 2 from different orientations.

The present disclosure has been described above with reference to exemplary embodiments. However, those skilled in the art, having read this disclosure, will recognize that changes and modifications may be made to the exemplary embodiments without departing from the spirit and scope of the present invention, and so the invention may be practiced with modifications within the spirit and scope of the appended claims.

It should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

I claim:

1. An apparatus that provides a detachable housing for a mobile device comprising:
   a frame configured to engage with a mobile electronic device, wherein the frame surrounds the mobile device, wherein the frame comprises a back plate, wherein the frame is configured such that a back surface of the mobile device is covered by and abuts the back plate, wherein the frame comprises two parallel rims extending from the plate, and wherein, upon attachment, the mobile device engages with the frame by fitting between the two parallel rims;
   a card reader adapted to allow swiping of a payment card within a slot associated with the card reader, the card reader permanently affixed to the frame, wherein the housing includes a slot for guiding payment card swipes through the card reader, wherein the frame internally routes electronic communications between the card reader and the mobile electronic device;
   a neck that extends away from and is connected to the frame, the neck configured to provide support for the frame; and
   a base that supports the neck, wherein the neck extends from the base to the frame and connects the base to the frame, wherein the base is configured to swivel about a vertical axis, the swiveling of the base causing the frame and the affixed card reader to move in a direction along the swiveling of the base.

2. The housing of claim 1, wherein the neck supports the frame with a pivot joint, wherein the pivot joint allows the frame to pivot about a horizontal axis.

3. The housing of claim 1, wherein the housing comprises a pad configured to facilitate contactless payment methods by the card reader.

4. The housing of claim 3 wherein the housing encases a cable that provides electronic communication between the mobile device and the card reader.

5. The housing of claim 2, wherein the pivot joint is configured to allow the frame to rotate between a portrait orientation of the mobile device and a landscape orientation of the mobile device.

6. A housing for a mobile device comprising:
   a frame configured such that a mobile electronic device slideably engages with the frame, wherein the frame surrounds the mobile device, wherein the frame comprises a back plate, and wherein the frame is configured such that a back surface of the mobile device is covered by and abuts the back plate of the frame;
   a card reader adapted to allow swiping of payment cards within a slot associated with the card reader, the card reader permanently affixed to the frame, wherein the frame includes a slot for guiding payment card swipes through the card reader, wherein the card reader is in electronic communication with the mobile electronic device;
   a neck configured to provide support for the frame; and
   a base that supports the neck, wherein the base is configured to swivel the frame and the affixed card reader about a vertical axis.

7. The housing of claim 6, wherein the neck supports the frame with a pivot joint, wherein the pivot joint allows the frame to pivot about a horizontal axis.

8. The housing of claim 7, wherein the pivot joint is configured to allow the frame to rotate between a portrait orientation of the mobile device and a landscape orientation of the mobile device.

9. A housing for a mobile device comprising:
   a frame that surrounds the mobile device, wherein the frame comprises a back plate, and wherein the frame is configured such that a back surface of the mobile device is covered by an abuts the back plate;
   a payment section for reading payment cards, the payment section permanently affixed to the frame, wherein the payment section includes a slot for guiding payment card swipes through a card reader, wherein the card reader is in electronic communication with the mobile electronic device;
   a neck that supports the frame; and
   a base that supports the neck, wherein the base is configured to swivel the neck, the frame, and the payment section about a vertical axis.

10. The housing of claim 9, wherein the neck supports the frame with a pivot joint, wherein the pivot joint allows the frame to pivot about a horizontal axis.

11. The housing of claim 10, wherein the pivot joint is configured to allow the frame to rotate between a portrait orientation of the mobile device and a landscape orientation of the mobile device.

12. The housing of claim 9, wherein the housing comprises a pad configured to facilitate contactless payment methods by the card reader.

13. The housing of claim 9, further comprising a locking mechanism that secures the mobile device within the frame when engaged.

* * * * *